United States Patent [19]
Dawson

[11] Patent Number: 5,771,631
[45] Date of Patent: Jun. 30, 1998

[54] LANDSCAPING BLOCK

[75] Inventor: William B. Dawson, Maple Grove, Minn.

[73] Assignee: Keystone Retaining Wall Systems, Inc., Bloomington, Minn.

[21] Appl. No.: 741,344

[22] Filed: Oct. 29, 1996

Related U.S. Application Data

[63] Continuation of Ser. No. 245,869, May 19, 1994, Pat. No. 5,568,994.

[51] Int. Cl.⁶ .............................. A01G 1/00; E01C 11/22
[52] U.S. Cl. .................................... 47/33; 52/102; 404/7
[58] Field of Search .............................. 47/33; 404/7, 8; 52/102

[56] References Cited

U.S. PATENT DOCUMENTS

| | | |
|---|---|---|
| 315,026 | 2/1885 | Castonguay et al. . |
| 606,151 | 6/1898 | Johnson ..................................... 404/7 |
| 683,305 | 9/1901 | Levin ......................................... 404/7 |
| 1,677,829 | 7/1928 | Jack . |
| 1,746,169 | 2/1930 | Swanson . |
| 2,196,552 | 4/1940 | Garloff . |
| 2,471,226 | 5/1949 | Maccario . |
| 2,550,945 | 5/1951 | Steinhage et al. . |
| 3,354,592 | 11/1967 | Curci . |
| 4,074,479 | 2/1978 | Krupka ..................................... 404/7 |
| 4,281,473 | 8/1981 | Emalfarb et al. . |
| 4,314,431 | 2/1982 | Rabassa . |
| 4,644,685 | 2/1987 | Tisbo et al. . |
| 4,761,923 | 8/1988 | Reum et al. . |
| 4,802,320 | 2/1989 | Forsberg . |
| 4,971,475 | 11/1990 | Castonguay et al. . |
| 5,092,076 | 3/1992 | Terreta . |
| 5,134,817 | 8/1992 | Richardt . |
| 5,139,721 | 8/1992 | Castonguay et al. . |
| 5,261,760 | 11/1993 | Castonguay et al. . |

FOREIGN PATENT DOCUMENTS

| | | | |
|---|---|---|---|
| 775634 | 7/1934 | France ...................................... 404/7 |
| 1333889 | 6/1963 | France ...................................... 404/7 |
| 2848991 | 5/1980 | Germany ................................... 47/33 |

OTHER PUBLICATIONS

Border Concepts, Inc., "Steel Landscape Edging Systems", Brochure 1992.
Pave Tech Inc., "Paver Edge Restraining System", Brochure 1992.

Primary Examiner—Michael J. Carone
Assistant Examiner—Robert Pezzuto
Attorney, Agent, or Firm—Popovich & Wiles, P.A.

[57] ABSTRACT

The invention includes a block for use in landscaping and other applications. The block may have a lip on one or both sides that may function as a mowing strip. The block may have grooves on the bottom for receiving an anchoring strip or defining a conduit. Also, one or both ends of the block may be angled to create a straight, curved, or curvilinear border.

10 Claims, 24 Drawing Sheets

LANDSCAPING BLOCK

This is a continuation of application Ser. No. 08/245,869 which issued a U.S. Pat. No. 5,568,994 on May 19, 1994.

BACKGROUND OF THE INVENTION

1. Field of the Invention

The present invention is directed to the field of landscaping and blocks used to construct a decorative and functional border, curb or edge, and a method of manufacturing the blocks. The present invention may be readily retrofitted onto existing common edging materials or installed without use of such edging materials. The present invention also may be used as an edge restraint for use with paving stones or bricks or to provide decorative accent lines of contrasting color and texture in paver brick or stone installations.

2. Description of the Prior Art

Numerous methods and materials exist for the construction of borders, curbs or edging for landscaping or site improvement work. Such borders, edges or curbs serve several functions. First, they are decorative, and provide an orderly transition from a garden area to a lawn, or from a lawn to a sidewalk, etc. Second, they serve to separate different areas with different forms of plant life or other landscaping elements, thereby reducing maintenance requirements such as removing weeds, or trimming back plant life that would otherwise spread. Third, they can ease the process of lawn mowing by eliminating the need to hand trim the border areas of the lawn after mowing the main areas with a mechanical lawn mower.

One method for the construction of edgings for use around gardens or to divide sections of a garden involves the use of lengths of flexible metal or plastic edging materials that are anchored by digging a trench, placing the edging material, anchoring the edging material by driving spikes through it into the ground, and then filling the trench with dirt. Such methods are common and relatively inexpensive, but have several disadvantages. First, such materials do not have a natural, yet orderly appearance that is aesthetically pleasing in a landscaping application, having instead a man-made appearance. Second, such materials are not easily fixed in straight lines or measured curves due to their flexible nature. Third, such materials are susceptible to damage during lawn mowing, and do not provide a "mowing strip" which would allow the wheels of a lawn mower to follow the contour of the edging and lessen the need for hand trimming along the borders of the lawn. Fourth, such edgings are susceptible to heaving from frost action in climates where the ground freezes.

Another method of providing an edging is the use of numerous natural stones or man-made bricks or blocks. Such stones or bricks are installed by digging a shallow trench and placing the stones or bricks more or less continuously along the length of the trench. Such materials may also simply be placed on top of the ground without digging a trench. Natural stone has long been used for this application, but lacks the advantages of the present invention for several reasons. First, natural stone is typically of irregular shapes and requires labor intensive fitting of the natural stones along the border or edging, or costly cutting of the pieces to fit. This irregularity also makes natural stone difficult to accommodate lawn mowing, and precludes the placement of a mowing strip. Bricks or rectangular blocks may also be used for lawn edging using a similar installation techniques. Rectangular blocks do not lend themselves to the construction of curvilinear edgings, which are found in most landscaping applications, because they must be cut to avoid gaps that may allow penetration of grass roots or other plant life and to provide an orderly appearance.

Another method for forming an edging or border has been to pour a concrete edging in place. The disadvantages of this method are the expense and effort involved. To install such an edging, an adequate trench must be dug, then forms must be constructed laying out the line of the edging, then the concrete must be mixed, poured, and allowed to cure. Such edgings may also require the placement of expansion material filled joints, and are susceptible to cracking. Electrical wiring, as for outdoor lighting, cannot be readily installed in such structures, and if installed, cannot be maintained and inspected without destruction of the edging. In addition, such edgings are not readily removed in the event a change in the contour of the lawn or garden border is desired. Finally, such edgings do not provide a desirable natural appearance.

There have also been efforts to address some of these deficiencies in the prior art through masonry block designs and wet cast concrete designs that are meant specifically for use as an edging. These designs either are composed of single units that are capable of being laid in straight or curved lines, or multiple unit systems with curved and straight pieces. These products are produced on concrete masonry block or paving machines, or through pre-casting with numerous concrete forms, and are designed to allow the construction of curved edgings. These products, while an improvement over using a simple rectangular brick, do not provide a natural appearance due to their molded appearance from the manufacturing process. None of these edges have a mowing strip incorporated as part of its process design. Moreover, these designs cannot be retrofitted over an existing plastic or metal edging, and cannot accommodate electrical wires for installation of low voltage electrical landscaping lights.

Another field in which the present invention may be used is the field of curbs or edge restraints for surfaces that are paved with concrete or brick pavers or paving stones, or asphalt or concrete or other paving materials. An example of curbing is disclosed in U.S. Pat. No. 4,971,475. Such curbing suffers from many of the limitations discussed above regarding edging, e.g., lack of curvilinear construction without time-consuming and costly on-site cutting, susceptibility to heaving from freeze/thaw cycles, and inability for receiving electrical or other conduits.

Examples of paver stones are disclosed in U.S. Pat. Nos. 4,711,599 and 4,834,575. Typical paver edging restraints are plastic or metal strips fixed in a manner similar to the flexible edging materials discussed above. For similar reasons, the paver edge restraints are also difficult to fix in straight measured curves, and are susceptible to heave from freeze/thaw cycles. Additionally, such restraints do not provide a conduit for drainage or electrical lines.

Another aspect of the present invention is a method of manufacturing landscaping blocks having a groove and/or an angled end. Examples of masonry block molding are disclosed in U.S. Pat. Nos. 5,062,610 and 4,335,549. However, these patents do not disclose how to mold blocks having an angled end and a split top surface.

Accordingly, it is an object of the present invention to provide a landscaping block that is constructed with a groove or channel designed into the bottom surface of each landscaping block so that each block may be installed over prevalent existing edgings or installed with or without inexpensive connectors of a design disclosed herein.

Another object of the present invention is to provide a landscaping block that has a mowing or paver support edge on one or both sides of the unit to ease lawn mowing or to provide an interlock ledge for the placement of pavers and surface to secure with a spike. This ledge or lip allows efficient lawn mowing in the vicinity of the edging. This lip also serves as a base line for the screening off of the base material required for the installation of a layer of paving stones or bricks and provides an edge structure that assures the integrity of the base layer of sand commonly used underneath the paving stones.

Another object of the present invention is to provide a landscaping block such that the uppermost surface of each unit has a natural stone appearance.

Another object of the invention is to provide a landscaping block with sides that taper from the lip to the bottom along the block's length to better resist the effects of frost heave, and to ease installation.

Another object of the invention is to provide a landscaping block with means to accommodate the passage of electrical wiring for outdoor lighting.

A still further object of the invention is to provide a landscaping block that combines some or all of the elements of each of the various objects disclosed above.

Another object of the present invention is to provide a landscaping block system that is constructed of blocks that are capable of forming either straight or curved edges, curbs or borders and incorporate some or all of the elements of each of the objects disclosed above.

Another object of the invention is a method of manufacturing landscaping blocks vertically in a mold and in pairs, where the top of each block has a split surface.

These and other objects of the present invention will become apparent with reference to the drawings, the description of the preferred embodiment and the appended claims.

SUMMARY OF THE INVENTION

In contrast to the prior art, the present invention provides for an improved landscaping block or edging. More particularly, the present invention relates to a landscaping block having a top and a generally opposed bottom, and first and second generally opposed sides, where each side extends from the top to the bottom. The block further includes first and second generally opposed ends, each end extending from the top to the bottom and from the first side to the second side. The first side includes a first upper face extending from the top downward to an inner edge of a first lip, and the first lip extends outward from the first upper face to an outer edge of the first lip for alignment of the outer edge of the first lip with an upper surface of a substrate when the block is inserted in the substrate. Further, the block has a first lower face extending from the outer edge of the first lip to the bottom. In accordance with a further aspect of the invention, the second side comprises a second upper face extending from the top downward to an inner edge of the second lip. The second lip extends outward from the second upper face to an outer edge of the second lip for alignment of the outer edge of the second lip with an upper surface of a substrate when the block is inserted into the substrate. Additionally, the second lower face extends from the outer edge of the second lip to the bottom.

In accordance with a further aspect of the invention, the first lower face is tapered inward from the outer edge of the first lip to a first bottom edge of the first lower face, and the second lower face is tapered inward from the outer edge of the second lip to a second bottom edge of the second lower face.

In accordance with a further aspect of the invention, the block further comprises first and second generally opposed interior walls extending from the bottom toward the top, defining a groove opening into the bottom and extending from the first end to the second end. The groove may have different cross-sectional shapes as viewed from one of the ends. In accordance with one embodiment of the invention, the groove has a generally rectangular cross-sectional shape. In another aspect of the invention, the groove has a generally key-hole cross-sectional shape. In another aspect of the invention, the groove has a curved cross-sectional shape towards the top and a generally rectangular cross-sectional shape adjacent the bottom.

In accordance with another aspect of the invention, the groove is tapered from the first end to the second end. In accordance with another aspect of the invention, the first end defines an acute angle from the first side to the second side and the second end is generally perpendicular to the first and second sides. Preferably, the acute angle is in the range from ten to eighteen degrees. Additionally, the first and second lips extend at least one-fourth inch from the inner edge.

In accordance with another aspect of the invention, a landscaping system is provided. More particularly, the system relates to means for anchoring landscaping blocks in a fixed position relative to a substrate having an upper surface, the anchoring means being partially embedded in the substrate. The system further includes one or more landscaping blocks, each of the blocks comprising a top and a generally opposed bottom, first and generally opposed sides, each side extending from the top to the bottom, first and second generally opposed ends, each end extending from the top to the bottom and from the first side to the second side, and the bottom comprising means for coupling the blocks with the anchoring means by receiving the anchoring.

In accordance with another aspect of the invention, a plurality of landscaping blocks are provided, where each of the blocks comprised as a top and generally opposed bottom, first and second generally opposed sides, each side extending from the top to the bottom, first and generally opposed ends, each end extending from the top to the bottom and from the first side to the second side, the bottom comprising first and second generally opposed interior walls extending from the bottom toward the top, defining groove opening into the bottom and extending from the first to the second end. Further, the blocks are placed end to end, the bottom of each block embedded in the substrate having an upper surface, the top of each block above the substrate upper surface, and the blocks defining an edging and the block grooves defining a continuous conduit.

In accordance with another aspect of the invention, a landscaping system is provided having means for coupling landscaping blocks in an end to end relationship with a plurality of blocks, each of the blocks comprising a top and a generally opposed bottom, first and second generally opposed sides, each side extending from the top to the bottom, first and second generally opposed ends, each end extending from the top to the bottom and from the first side to the second side, the bottom comprising first and second generally opposed interior walls extending from the bottom toward the top defining a groove opening into the bottom and extending from the first side to the second side. The blocks are positioned end to end and embedded in a substrate, and adjacent ends of adjacent blocks are connected by coupling means extending into the grooves of the adjacent blocks.

In accordance with another aspect of the invention, there is a method of molding a block comprising a top and a generally opposed bottom, first and second generally opposed sides, each side extending from the top to the bottom, first and second generally opposed ends, each end extending from the top to the bottom and from the first to the second side, wherein the first end defines an acute angle from the first side to the second side and the second end is generally perpendicular to the first and second sides. The method comprises the steps of positioning a platform in a mating position under a mold. The mold comprises a top, a bottom, and a continuous vertical wall extending from the mold top to the mold bottom defining a volume open at the top of the mold and further defining the cross-sectional shape of the block. The inner wall comprises a first pair of opposed side walls defining the top and bottom of the block, and a second pair of opposed side walls defining the first and second sides of the block. The second pair of opposed side walls are angled at the top of the mold to define the first angled end of the block, and the platform, positioned at the bottom of the mold, defines the second end of the block. Additionally, the method includes introducing a block forming substance into the volume and compressing the block forming substance in the volume from the top of the mold with a shoe having an angle that is complementary to the angled top end of the second pair of opposed side walls of the mold. Additionally, the method includes the steps of moving the platform into a de-molding position away from the mold and removing the shoe to leave the molded block. The method may further include vibrating the mold and platform after introducing a block-forming substance into the volume. Further, the mold may comprise a plurality of volumes.

In accordance with another aspect of the invention, there is a method of making a first and second block, each block comprising a top and a generally opposed bottom, first and second generally opposed sides, each side extending from the top to the bottom, first and second generally opposed ends, each end extending from the top to the bottom and from the first to the second side, wherein the first end defines an acute angle from the first side to the second side and the second end is generally perpendicular to the first and second sides. The method comprises the steps of positioning a platform in a mating position under a mold. The mold comprises a top, a bottom, and a continuous vertical wall extending from the mold top to the mold bottom defining a volume open at the top of the mold and further defining a composite block having the cross-sectional shape of the first and second block position so that the top of the first block is parallel and connected to the top of the second block and the angled first ends of the first and second blocks are at the top of the mold, wherein the inner wall comprises a first pair of opposed sidewalls defining the bottom of the first block and bottom of the second block, and a second pair of opposed sidewalls defining the first and second sides of the first and second blocks, the second pair of opposed sidewalls angled at the top of the mold to define the first angled end of the first and second blocks, and the platform at the bottom of the volume defining the second end of the first and second blocks. Additionally, the method includes introducing a block forming substance into the volume and compressing the block-forming substance in the volume from the top of the mold with a shoe angled complementary to the angled top end of the second pair of opposed sidewalls of the mold. Additionally, the method includes moving the platform into a de-molding position away from the mold and removing the shoe to leave the composite block. Additionally, the method may further include splitting the composite block along the plane of the connected tops of the first and second blocks forming the separate, disconnected first and second blocks. The method may further include vibrating the mold and platform. Further, the mold may comprise a plurality of volumes. Further, the block may be split by a splitting machine comprising a top splitting blade having a serrated lower edge. Further, the adjacent blocks remain adjacent as a result of splitting the composite block.

DETAILED DESCRIPTION OF PREFERRED EMBODIMENTS

Figure 1:
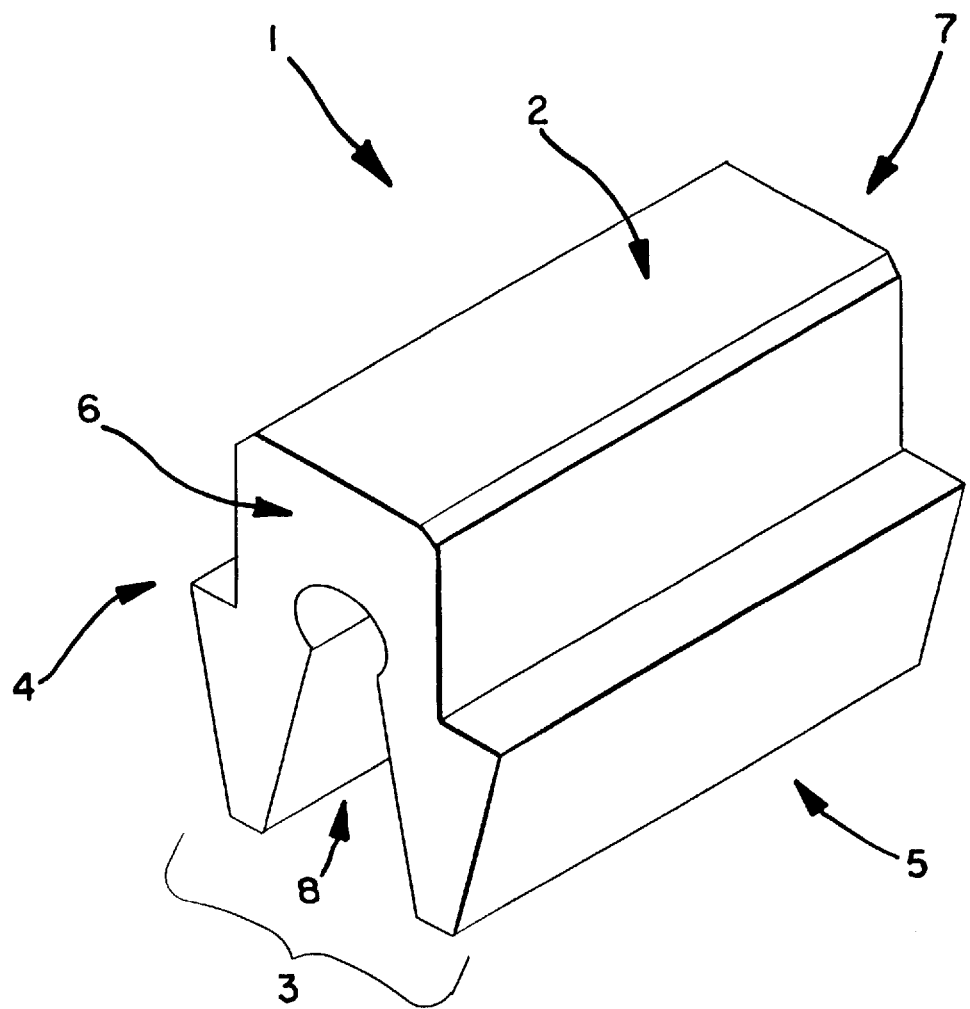
FIG. 1 is a perspective view of a landscaping block in accordance with the invention.

Referring to FIGS. 1–6c there is shown a landscaping block 1 of the present invention. Block 1 is made of a rugged, weather-resistant material, preferably pre-cast concrete. Other suitable materials are plastic, reinforced fibers, wood, metal, and stone. As shown in FIG. 1, block 1 includes a top 2, a generally opposed bottom 3, and first and second generally opposed sides 4, 5, each side extending from top 2 to bottom 3. First and second generally opposed ends 6, 7 extend from top 2 to bottom 3 and from first side 6 to second side 7. Groove or channel 8 extends from bottom 3 into block 1 toward top 2, thereby having an opening at bottom 3, and extends from first end 6 to second end 7.

In a preferred embodiment of the invention, block 1 extends approximately six inches from first end 6 to second end 7, four inches from top 2 to bottom 3, and four inches from first side 4 to second side 5 at lip 12. With these dimensions, block 1 is light enough for relatively easy transport and placement, provides adequate separation height and width for edging, as well as providing a deep enough mower strip to reduce hand-trimming, and allows for easy construction of a variety of straight and curved edging patterns. However, in order to meet the requirements of different applications, block 1 may have larger or smaller dimensions and varying proportions.

Figure 2A:
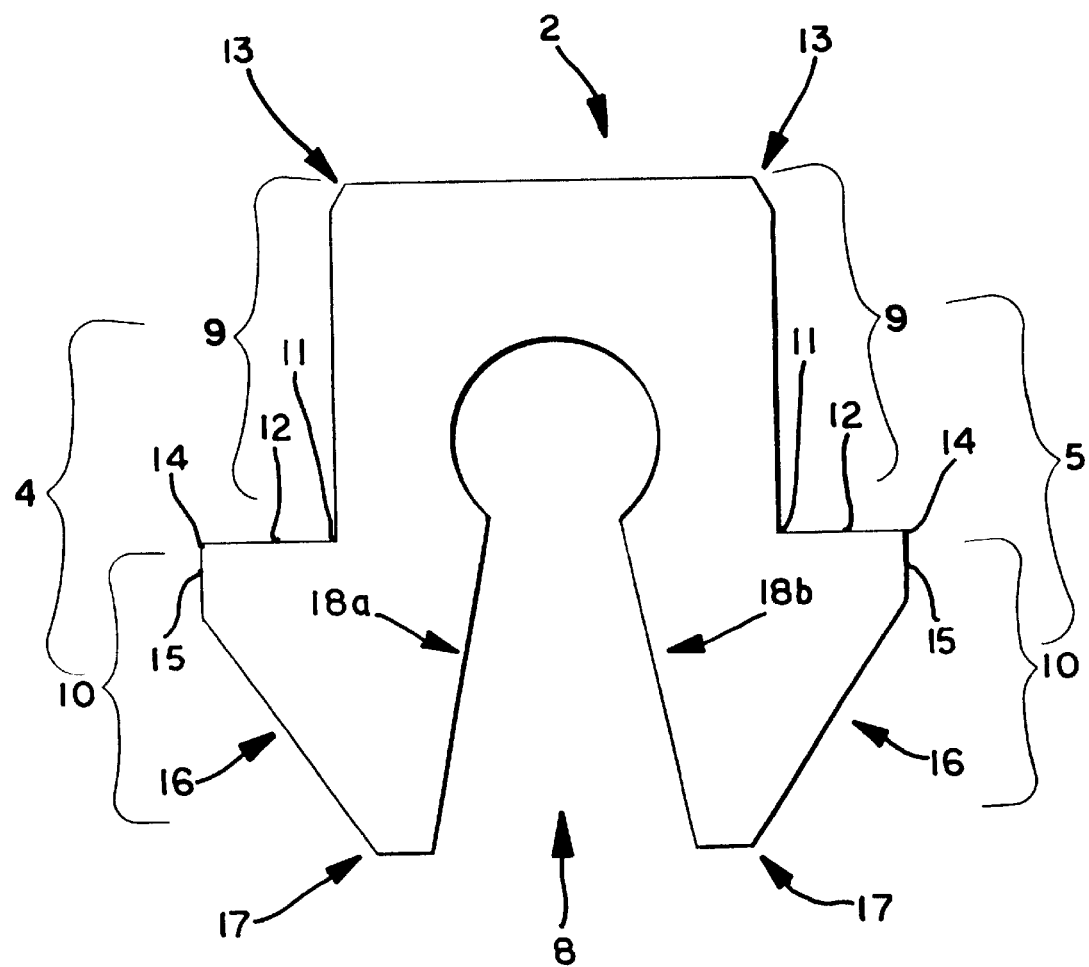
FIG. 2a is an end view of a landscaping block in accordance with the invention.

As shown in FIG. 2a, sides 4,5 each have an upper face 9 and a lower face 10. Upper face 9 is generally above-ground when the block is in use, providing the visual edging or separation. Lower face 10 is at and below ground level and, in conjunction with groove 8, fixes block 1 in place in a substrate, typically dirt, sand, or other natural material.

Figure 2B:
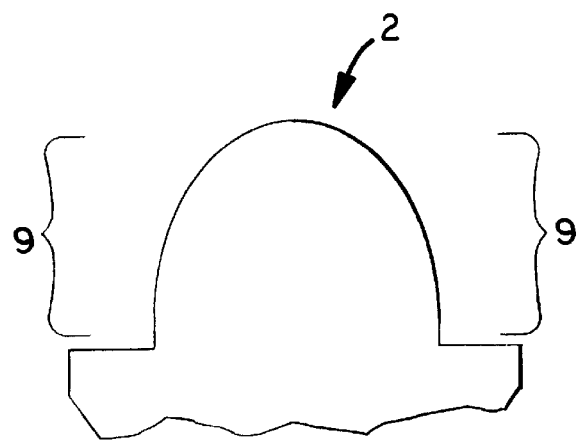
FIGS. 2b–2f are partial end views of alternate embodiments of a landscaping block in accordance with the invention.
Figure 2C:
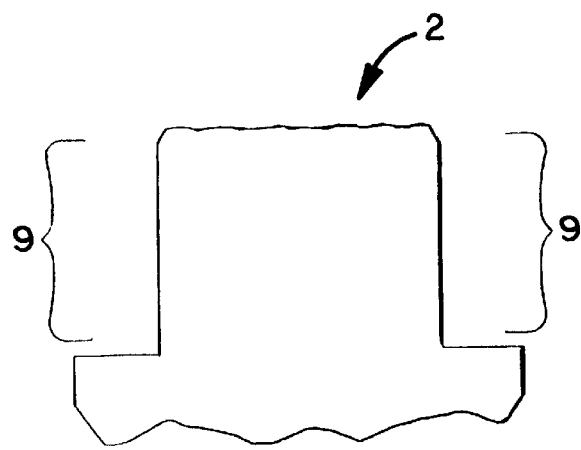
Figure 2D:
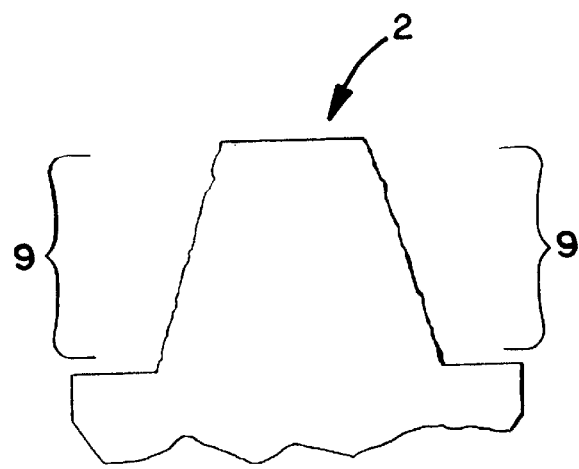
Figure 2E:
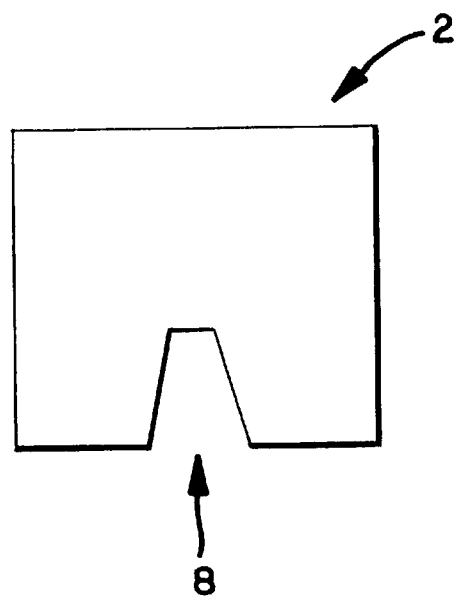
Figure 2F:
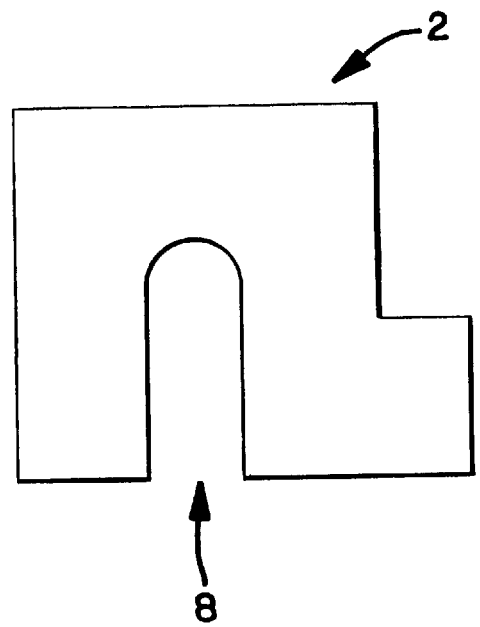

Upper face 9 extends from top 2 downward to inner edge 11 of lip 12. Face 9 may be planar and, in a preferred embodiment, includes beveled edge 13 adjacent top 2. As shown in FIGS. 2b–2d, top 2 and face 9 may have a variety of curved and/or textured shapes to meet the specific needs of any given application. Also, FIGS. 2e and 2f disclose alternate embodiments of block 1 with one or no lip 12.

Figure 2G:
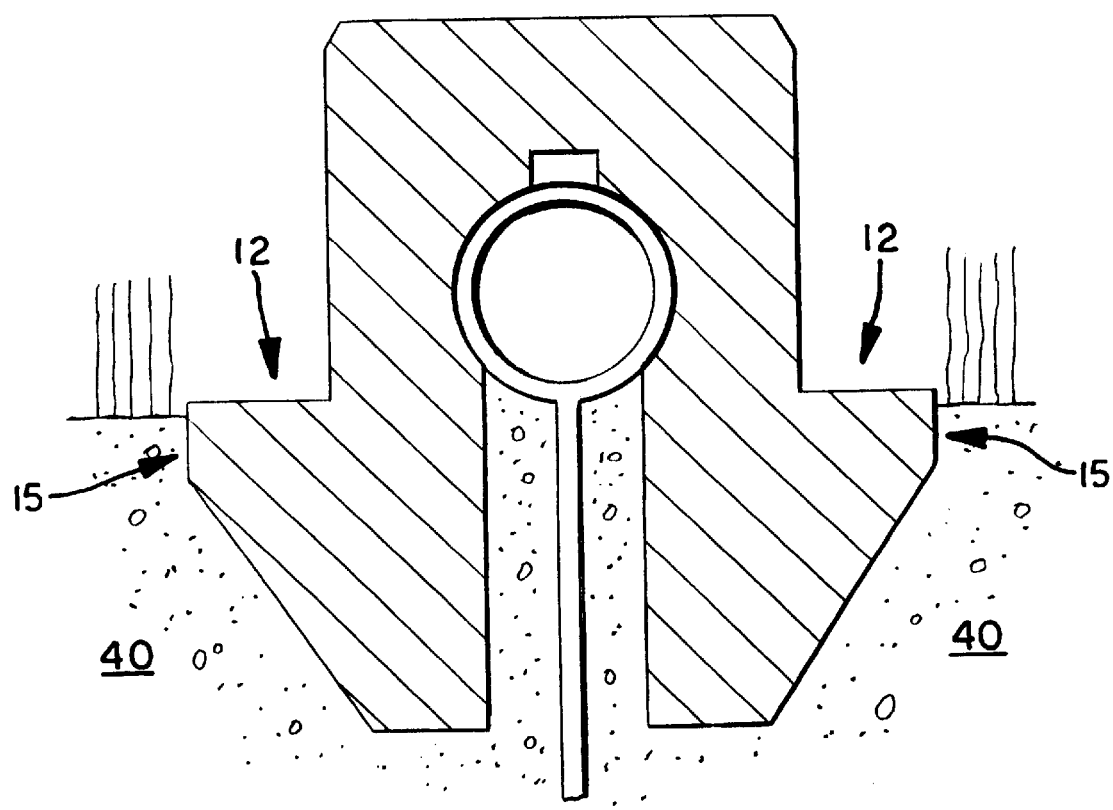
FIG. 2g is an end view of a landscaping block inserted into a substrate in accordance with the invention.

Lip 12 defines a transition from upper face 9 to lower face 10. Ledge 12 extends outwardly from upper face 9 to outer edge 14, at least about one-fourth inch and preferably about five-eighths inch. As shown in FIG. 2g, ledge 12 provides a mowing edge or strip that allows the wheels of a lawn mower to follow the contours of the block and allows the lawn mower to cut the grass adjacent the mowing strip, lessening the need for hand-trimming along the borders of a lawn.

Figure 17:
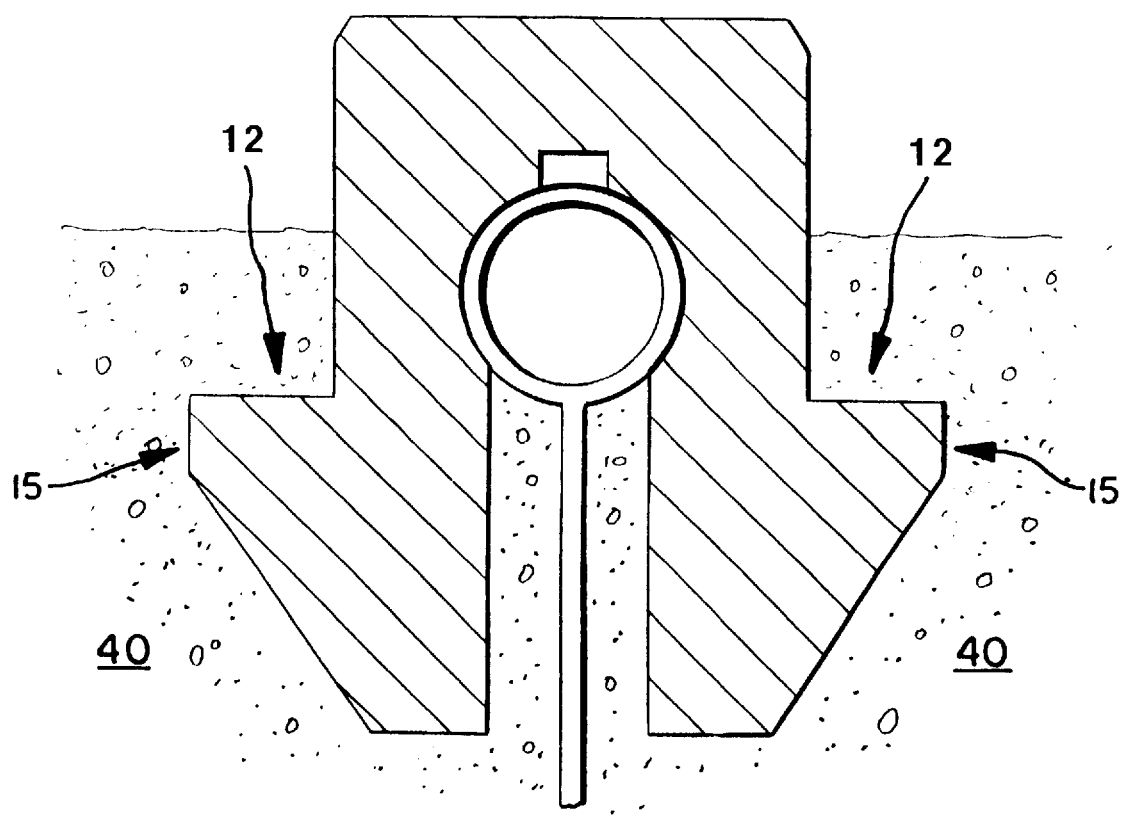
FIG. 17 is an end view of a landscaping block inserted into a substrate in accordance with one embodiment of the invention.

In other application of block 1, ledge 12: (1) provides, as shown in FIG. 17, an anchoring surface for placement of landscape rock 40, etc.; (2) serves as a screed board leveling surface for paver installations and provides interlock to prevent deterioration or loss of sub-base materials when used as a paver curb or edging; and (3) locks block 1 in place when used as an accent or passageway for conduit through a paved surface.

Extending downward from outer edge 14 of ledge 12, lower face 10 has alignment strip 15 for easier placement of block 1 in the substrate and tapered portion 16 extends to bottom edge 17. The advantages of tapered portion 16 are discussed below.

Figure 3A:
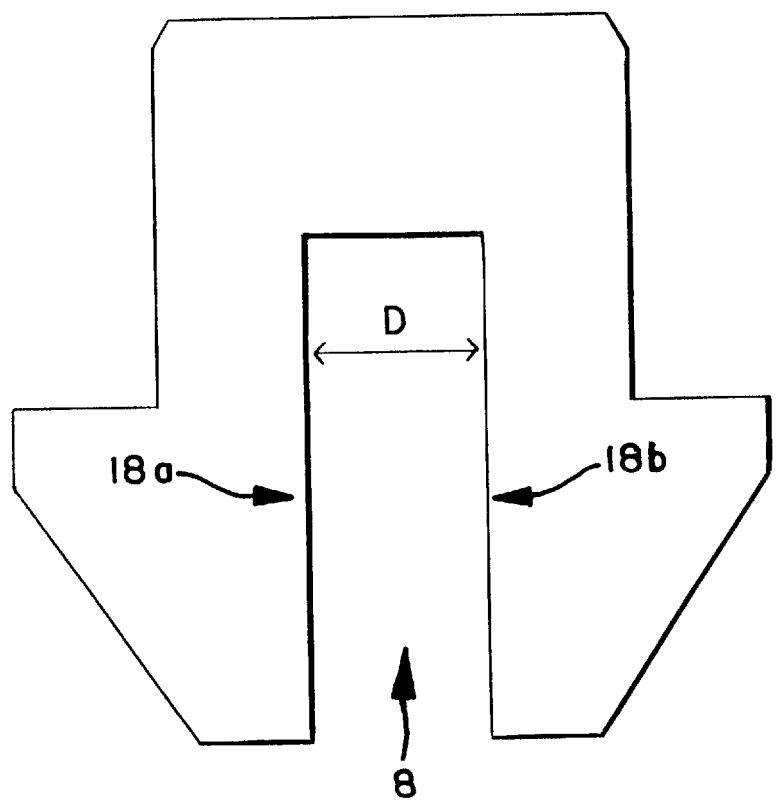
FIGS. 3a–3c are end views of alternate embodiments of a landscaping block showing the groove in accordance with the invention.
Figure 4A:
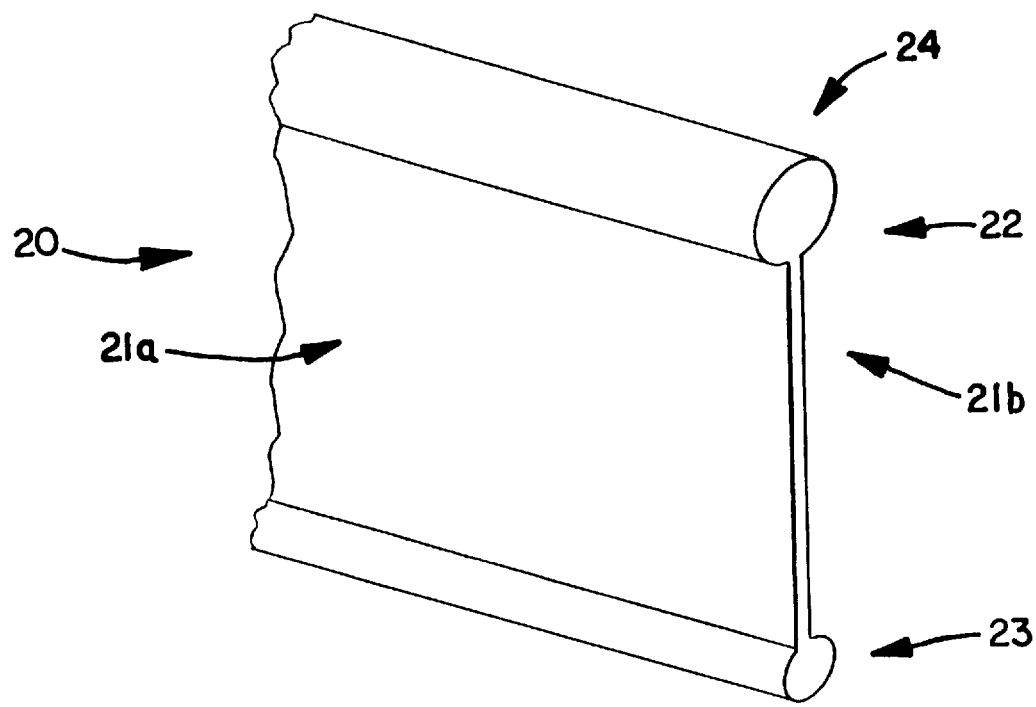
FIG. 4a is a perspective view of anchoring means in accordance with the invention.
Figure 4B:
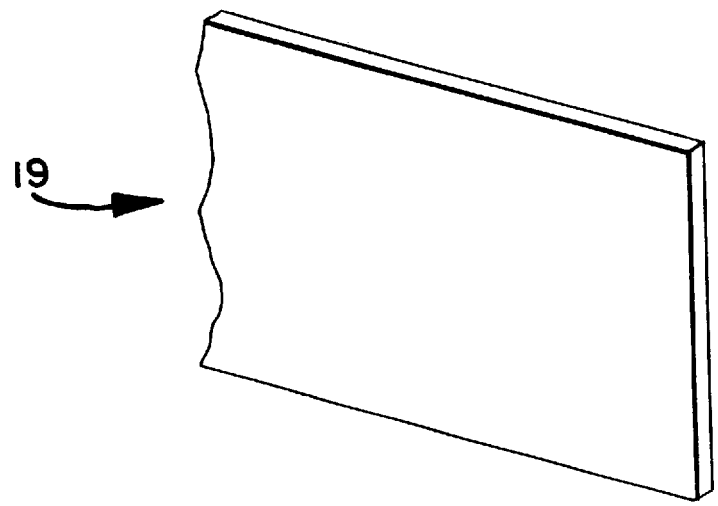
FIG. 4b is a perspective view of an alternate embodiment of anchoring means in accordance with the invention.

As shown in FIG. 1, groove or channel 8 extends into block 1 from bottom 3 toward top 2. In an embodiment shown in FIG. 3a, groove 8 is defined by generally opposed interior walls 18a, 18b. The width of slot 8, identified by arrow D, is the distance between the opposed interior walls 18a, 18b and is wide enough to receive commonly available black plastic edging 19. As shown in FIGS. 4a and 4b, edging 19 may have various configurations. Typically, edging 19 have a lower bead or protrusion to allowing nailing or spiking in place. FIG. 4a shows commonly available flexible black PVC edging or strip 20 having opposed vertical walls 21a, 21b, and a top 22 and a bottom 23 edge. As shown in FIG. 4a, top edge 22 may include an elongated bead 24. As shown in FIG. 4b, edging 19 may be a planar strip made of aluminum or other suitable material. Edging 19 should be flexible to create the desired border shape and made of a suitable material for use in the desired substrate. Typically, edging 19 is partially embedded in a substrate by digging a small trench, and also may be fixed in place by stakes.

Figure 3B:
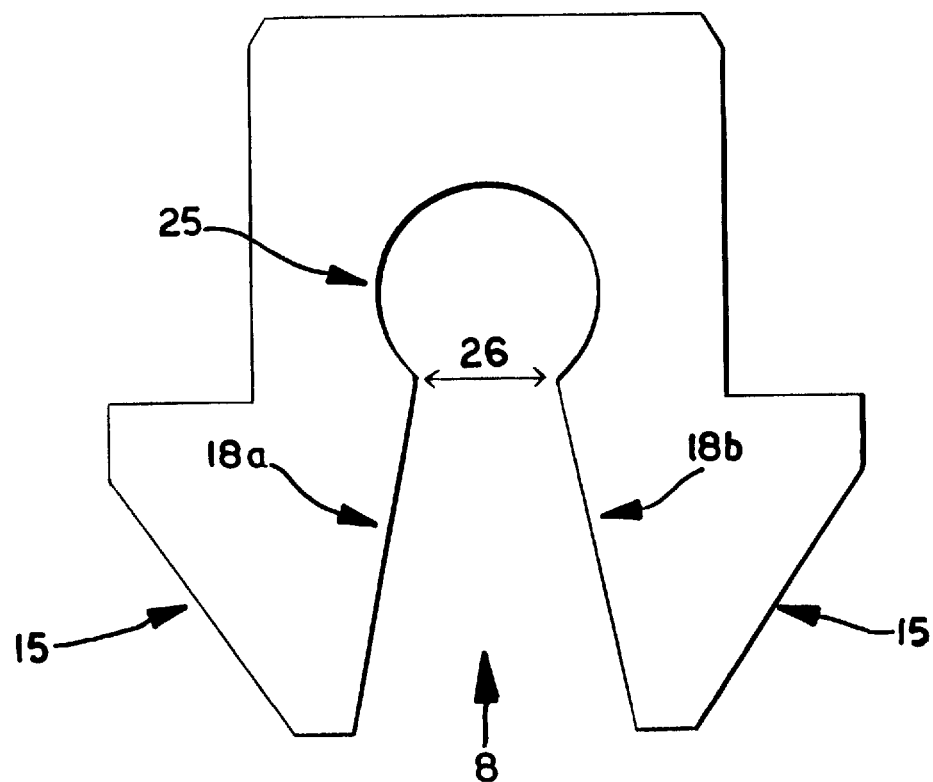
Figure 3C:
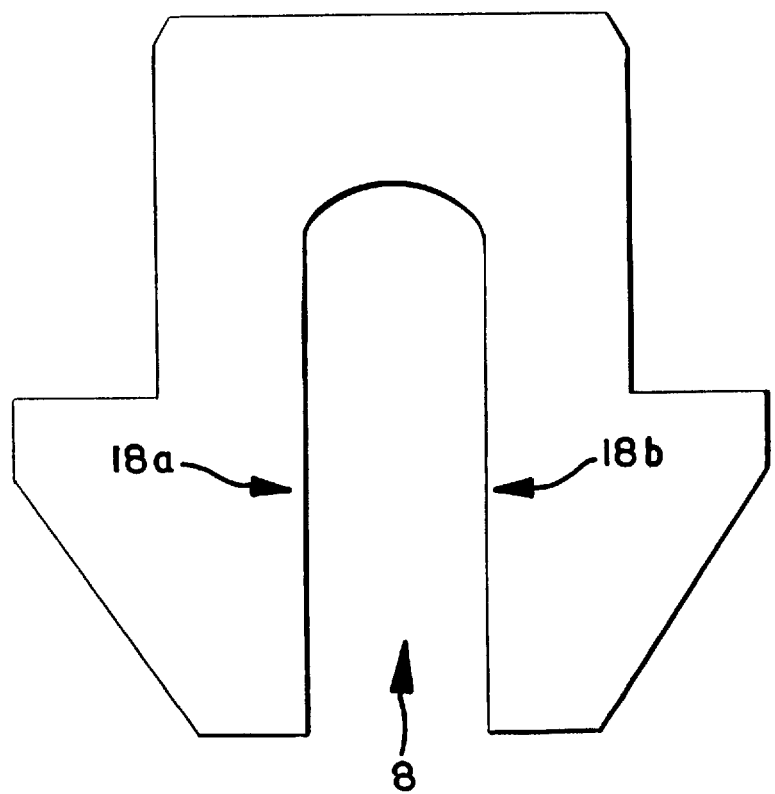

Cavity 8 allows block 1 to fit over the top of and receive edging 19 or, as shown in FIG. 3b, block 1 can be locked onto edging 20 by the keyhole cross-sectional configuration of slot 8. In the locking embodiment of FIG. 3b, opposed interior walls 18a, 18b define an upper annular receiving portion 25 for receiving the bead 24 of edging 20. Receiving portion 25 has a lower opening that forms neck 26 which prevents bead 24 from moving downward out of upper receiving portion 25 without substantial force exceeding the normal forces of the surrounding substrate during freeze/thaw cycles. The lower portions of walls 18a, 18b preferably taper outward or diverge towards sides 4, 5. Also, groove 8 can be tapered from one end 6 to the other end 7, i.e., the slot width increases from one end 6 to the other end 7, for easier attachment and detachment of block 1 to strip 20.

In the embodiment shown in FIG. 3a, interior walls 18a, 18b are approximately parallel, defining a rectangular region for receiving a planar edging. In another embodiment shown in FIG. 3c, interior walls define an upper curved shape at the top of groove 8 and a generally rectangular cross-sectional shape adjacent the bottom, accommodating a variety of edgings.

Figure 3D:
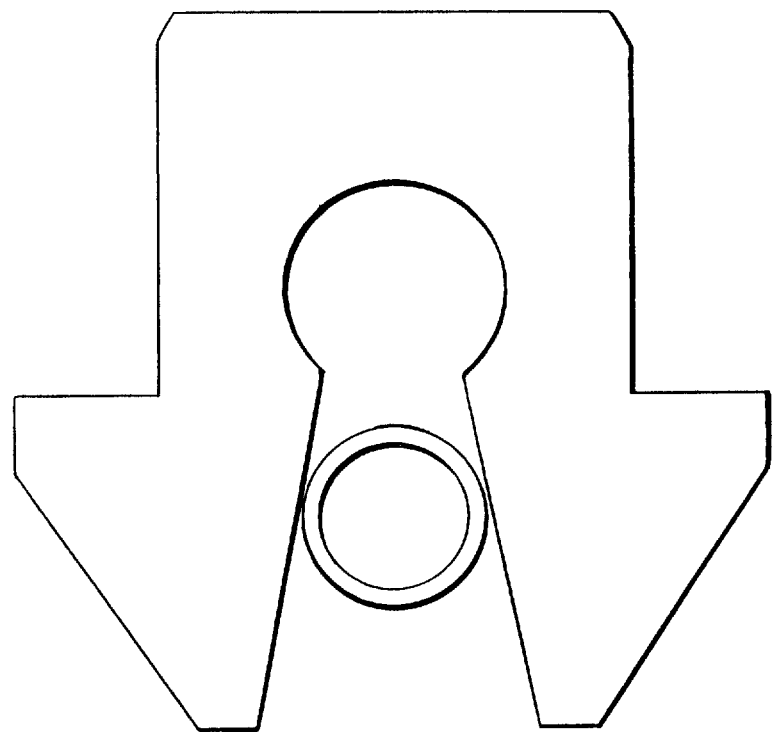
FIG. 3d is an end view of a landscaping block positioned over a pipe in accordance with the invention.
Figure 3E:
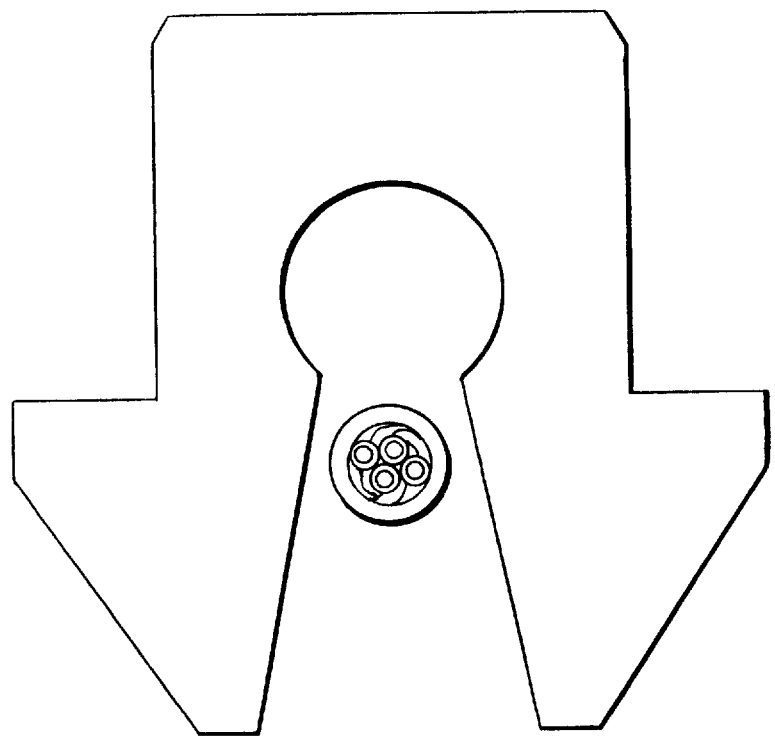
FIG. 3e is an end view of a landscaping block positioned over electrical wiring in accordance with the invention.

Groove or channel 8 accomplishes several goals. First, blocks 1 can be locked into place over existing edging, which serves as an alignment guide, concealing the plastic or metal edging and providing an attractive, natural-looking edging. Second, slot 8 provides connection, coupling, aligning, and anchoring means, assisting in the installation of the edging. Finally, groove 8 allows for passage of pipe or other conduit for irrigation as shown in FIG. 3d or electrical wiring as shown in FIG. 3e along the edging.

In the embodiment of the invention shown in FIG. 3b, tapered portion 15 of lower face 10 on sides 4, 5 and diverging interior walls 18a, 18b provide several advantages. First, this embodiment is more easily installed by allowing block 1 to be more easily inserted into the substrate or soil than a flat bottomed surface. Second, this embodiment is more easily inserted over edging 19 and locked into place. Third, this embodiment is more resistant to frost heave than a flat bottomed surface, thereby retaining its position in the substrate over a period of years. Finally, this embodiment allows block 1 to fit over pipes or conduits that would otherwise be too wide.

Figure 5A:
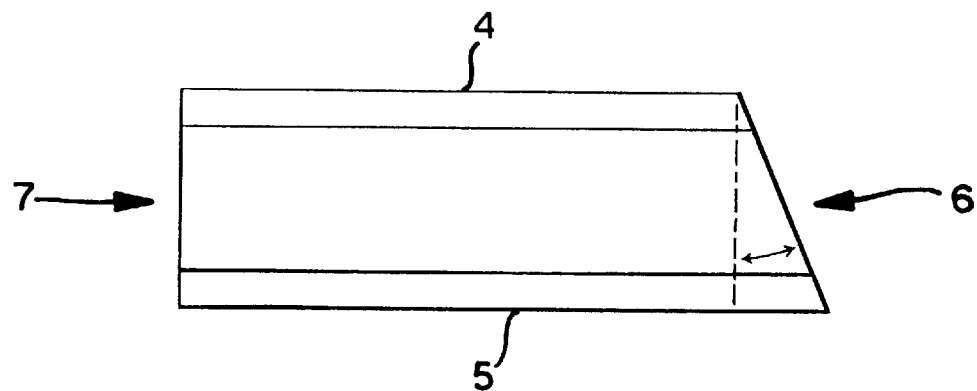
FIG. 5a is a top view of a landscaping block in accordance with the invention.
Figure 5B:
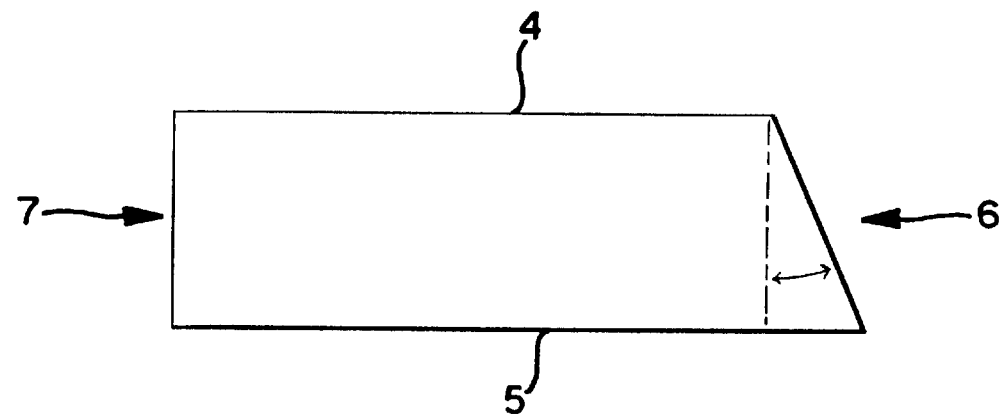
FIG. 5b is a top view of an alternate embodiment of a landscaping block in accordance with the invention.
Figure 5C:
FIG. 5c is a top view of landscaping blocks aligned end to end to form a straight border in accordance with the invention.
Figure 5D:
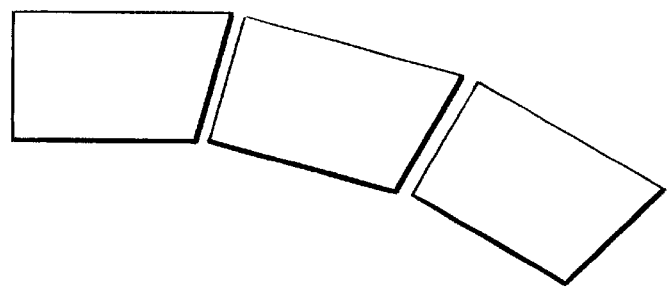
FIG. 5d is a top view of landscaping blocks aligned end to end to form a curved border in accordance with the invention.
Figure 5E:
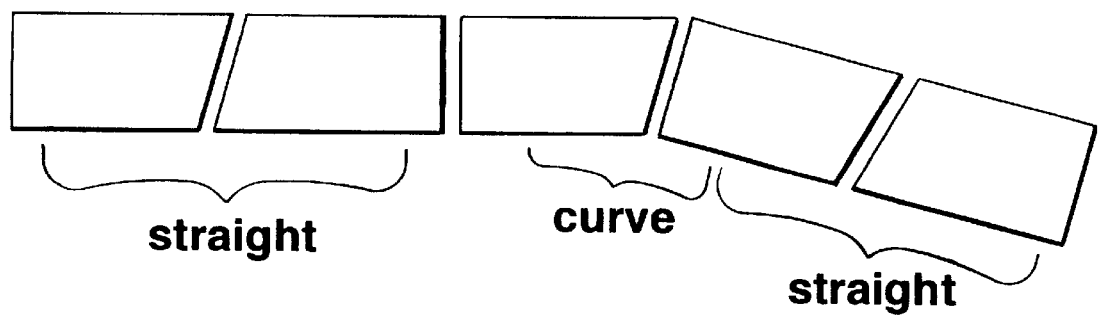
Figure 5e is a top view of landscaping blocks aligned end to end to form a curvilinear border in accordance with the invention.

The ends 6, 7 of block 1 provide another important aspect of the invention. In an embodiment of the invention shown in FIG. 5*a,* end 6 is angled approximately 12 degrees from side 4 to side 5, while end 7 is approximately perpendicular to sides 4, 5. FIG. 5*b* shows another embodiment of block 1 having an angled end 6, but without lip 12. A preferred range of angles is 10–18 degrees. As shown in FIGS. 5*c*–5*e,* straight-end/angled-end block configurations allow for various straight (FIG. 5*c*), curved (FIG. 5*d*), curvilinear (FIG. 5*e*) borders without having to cut the blocks at the installation site. At least nine different shapes can be achieved using two blocks. In other embodiments, the blocks may have both ends perpendicular to the sides, both ends angled from one side to the other, or ends with different angles. Preferred angles are those divisible into 360 degrees (i.e. 9, 12, 15, 18 and 24 degrees) so that the blocks can make a circle to be used around a tree, for example.

There are numerous options for the appearance of top 2 and upper face 9 of sides 4, 5. Any of these surfaces can have a natural or "split" surface, smooth surface, corduroy or other striated surface.

When block 1 is installed as shown in FIG. 2*g,* block 1 is inserted into a substrate 40, which may be earth or other material. Lip 12, preferably planar, and alignment strip 15 assist in placing block 1 in a preferred position wherein lip 12 is coplanar with the surrounding substrate. Lip 12 provides a mowing or spacer strip that separates top 2 and sides 4, 5 from the substrate by the length of lip 12. Lip 12 may be on one or both sides of block 1 depending on the application.

A combination of blocks 1 can be used to create several landscaping block systems. The first system is discussed above and shown schematically in FIG. 6*a.* A new or existing edging 19 provides means for anchoring landscaping blocks 1 in a fixed position relative to the substrate 40. Anchoring means 19 is partially embedded in the substrate. Using edging strip 20 disclosed in FIG. 4*a,* bottom edge 23 is embedded in the substrate and bead 24 is above the upper surface of the substrate. The bottom groove or coupling means 8 at the bottom 3 of each block 1 is placed over and receives anchoring means 19 and the lower face 10 of each block 1 is also embedded in the substrate. The blocks 1 are aligned end to end along strip 19 thereby defining the landscaping border or edging.

Figure 6A:
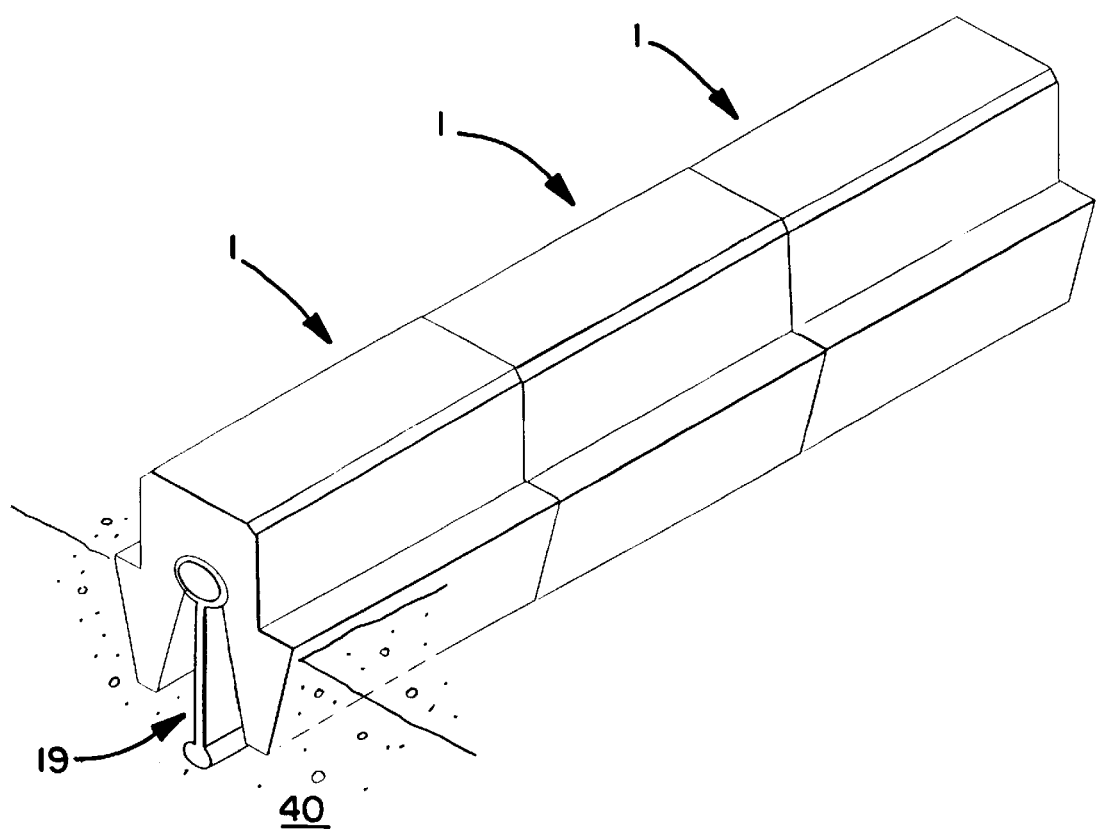
FIG. 6a is a perspective view of a landscaping block system in accordance with the invention.
Figure 6B:
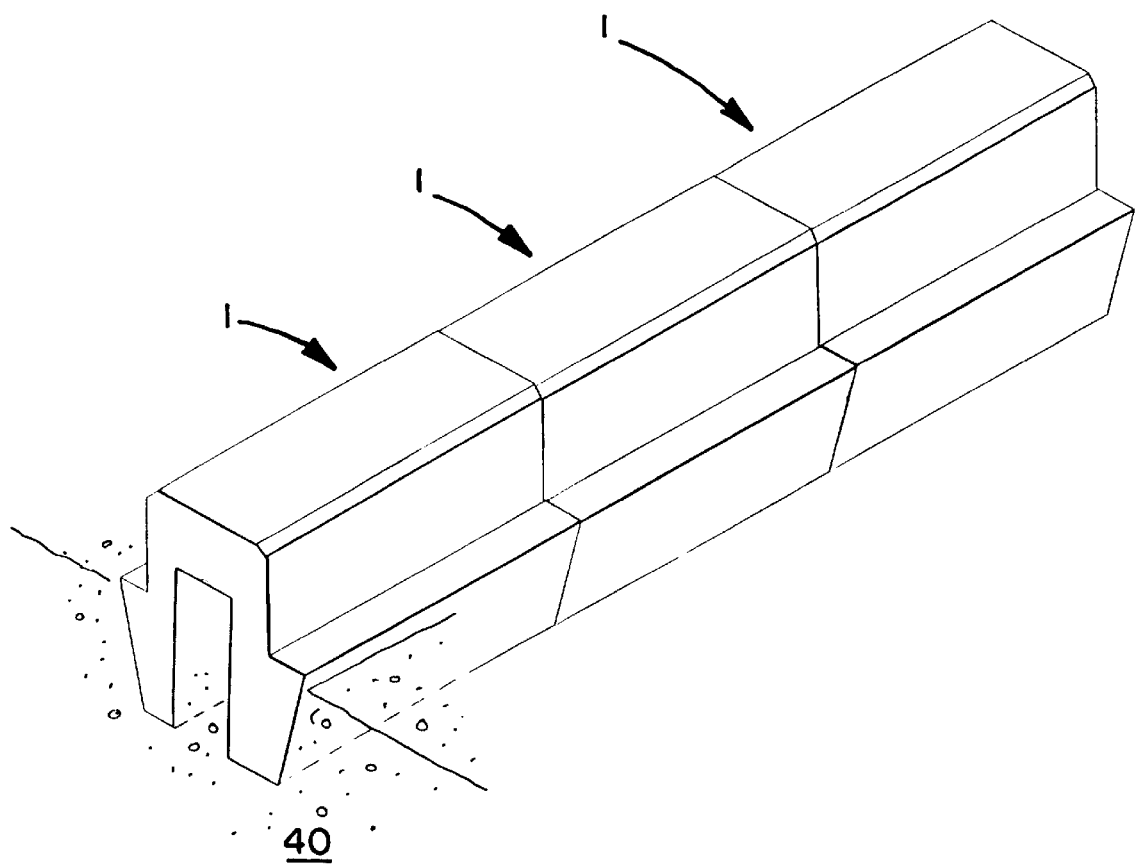
FIG. 6b is a perspective view of an alternate embodiment of a landscaping block system in accordance with the invention.

Another system is to insert the blocks 1 in a substrate end to end without using an edging 19, as shown in FIG. 6*b.* Again, lower face 10 is embedded in the substrate and upper face 9 and top 2 define the edging above the substrate surface. Grooves 8 then form an interior conduit that can receive pipes, conduit, electrical wiring, or function alone as a drainage conduit.

Figure 6C:
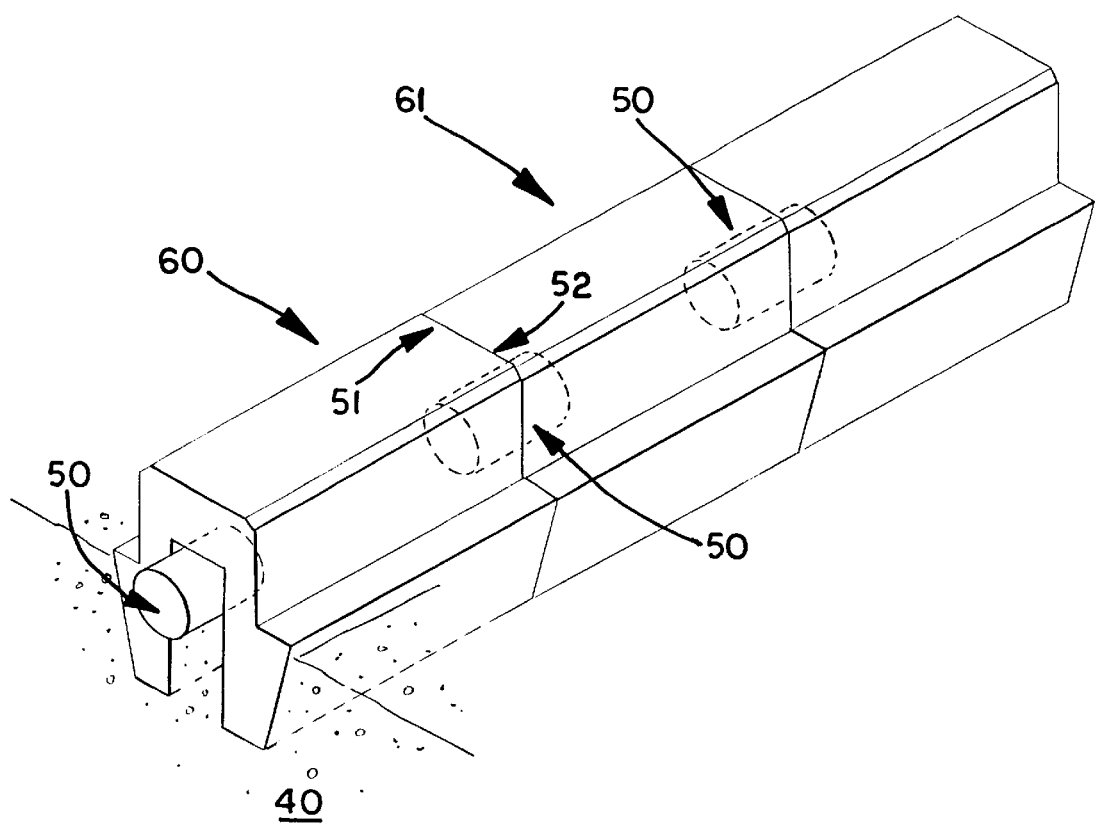
FIG. 6c is a perspective view of an alternative embodiment of a landscaping block system in accordance with the invention.

FIG. 6*c* discloses a third landscaping block system. The blocks 1 are inserted into substrate 40 end to end, thereby fixing the blocks 1 in the substrate. Alignment of the blocks is maintained by use of connectors or coupling means 50 that connect the adjacent ends of the adjacent blocks. For example, end 51 of block 60 is adjacent end 52 of block 61 and ends 51 and 52 are coupled by connector 50. The connectors can be tubing or a narrow strip that extends from the upper portions of adjacent grooves. Also, a single elongated tubing may pass through groove 8 from end to end the entire length of blocks.

Figure 7:
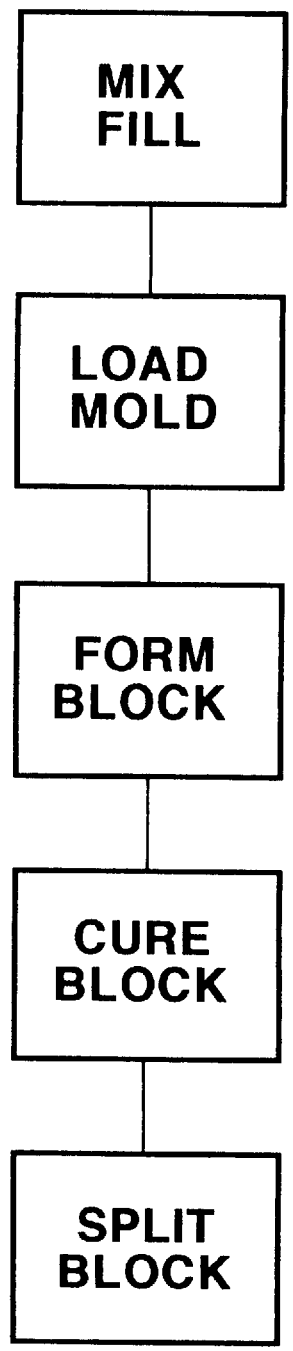
FIG. 7 generally shows the steps of manufacturing the landscaping blocks of the present invention.
Figure 8:
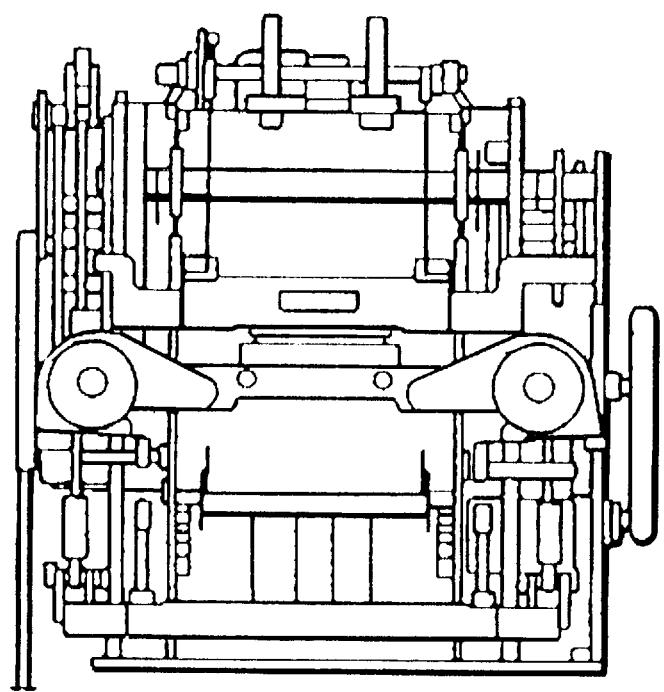
FIG. 8 is a front view of a block molding machine.

The method of the present invention is shown generally in FIG. 7. First, the block-forming materials, typically water, cement, sand, and aggregate, are mixed and transported to a block molding machine. A wide variety of mixtures are known to make blocks having various characteristics such as strength, water absorbtion, density, shrinkage, and other factors meeting ASTM standards and depending on the desired application of the block. The mixture is prepared in any number of mixers known in the art. The mixture is then placed in a hopper which transports the mixture to a block molding machine shown generally in FIG. 8. Any block molding machine known in the art may be used. One machine found useful is the V3-12 Vibrapac, made by Besser Company, Alpena, Mich.

Figure 9:
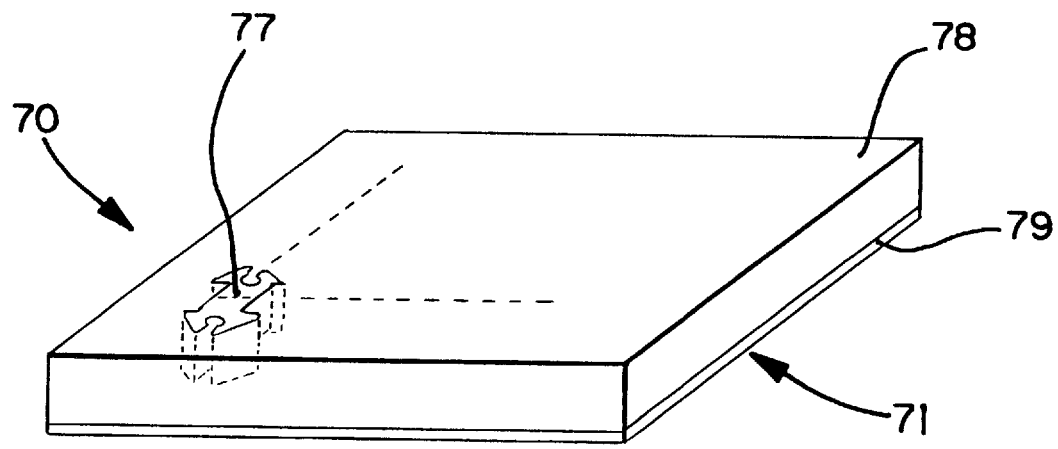
FIG. 9 is a perspective view of an embodiment of the mold and platform of the present invention.

The mixture or fill is then poured or loaded into mold 70 sitting on or mated with generally planar steel pallet 71 as shown in FIG. 9. Specific aspects of the mold are discussed further below. The top of mold 70 is then scraped with a cut-off bar to remove excess mixture. Mold 70 is then subjected to vertical compression by head 72 moving downward on top of mold 70. Further details of head 72 are provided below. Head 72 acts to compress the fill within mold 70 for a period of time sufficient to form a solid, contiguous block. Generally, each block producing cycle has a duration of six to twelve seconds at a total load of 1500 to 2000 pounds. Additionally, mold 70 and horizontal platform 71 may be agitated during compression.

Once the compression is complete, platform 71 is lowered vertically away from mold 70 into a de-molding or stripped position and head 72 pushes the newly molded blocks downward through mold 70 so that they remain on platform 71. Head 72 is then raised vertically.

Once the blocks are formed, they are cured by various means known in the art. Typically, blocks are cured in kilns for up to twenty-four hours under pressure and/or with steam. Once cured, the blocks may be split. Splitting methods such as hand-splitting with hammer and chisel, and machine splitting are known in the art. Additional details of the splitter used in connection with the present invention are provided below. After splitting, the blocks are palletized or otherwise packaged for shipment or storage.

Figure 10A:
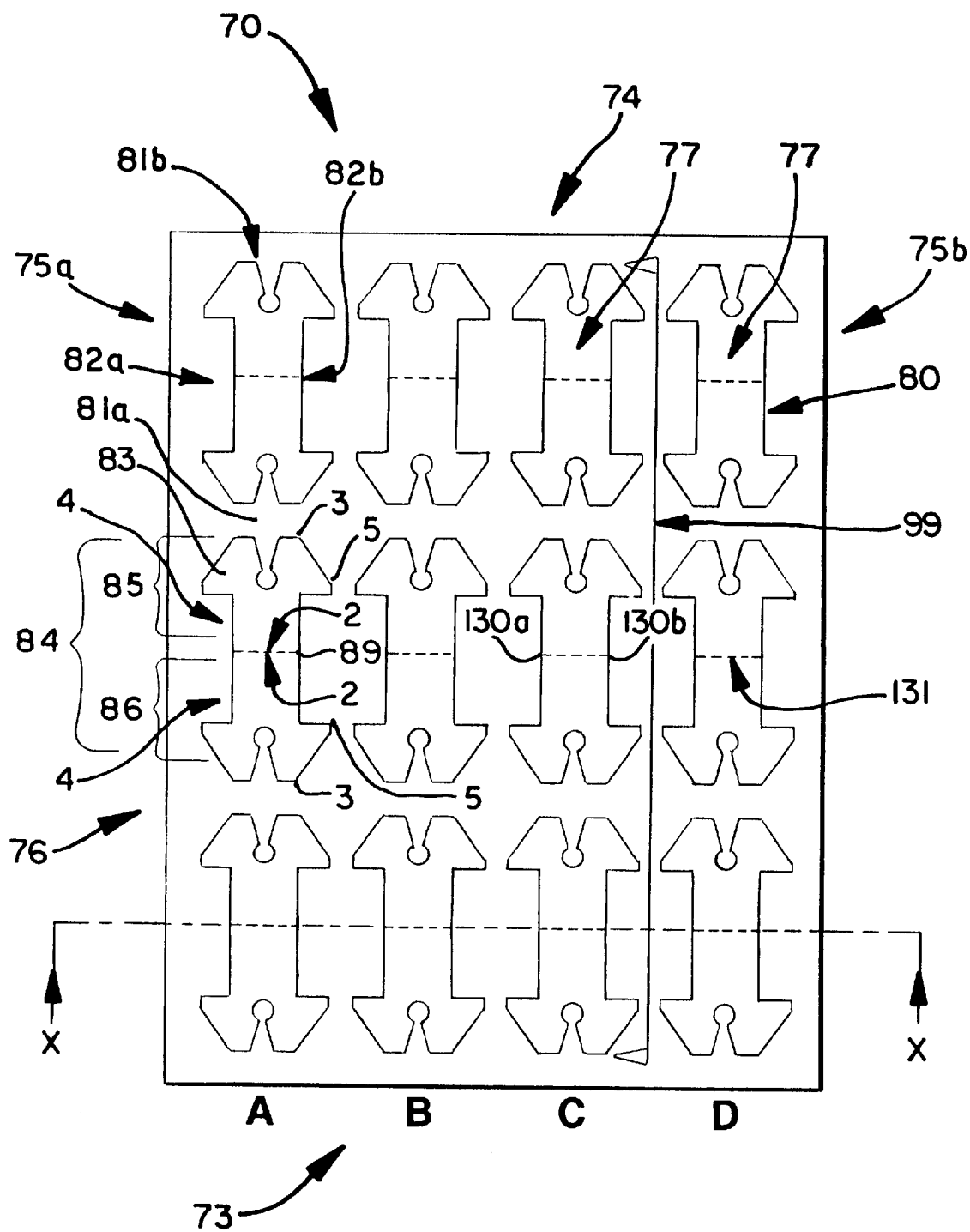
FIG. 10a is a top view of an embodiment of the mold of the present invention.

The method of the present invention is more specifically directed to molding landscaping block 1, having angled first end 6. In order to more easily and efficiently make block 1, mold 70 and compression head 72 are used. A top view of an embodiment of mold 70 is shown in FIG. 10*a.* Mold 70 has a front vertical wall 73, generally opposed back vertical wall 74, and generally opposed side walls 75*a,* 75*b* defining a generally rectangular, vertical outer wall or edge 76. Mold 70 further includes one or more volumes 77 extending from the top 78 to the bottom 79 of mold 70. Volume 77 is defined by a continuous vertical wall 80, described further below. When mold 70 is placed on top of or mated with platform 71, volume 77 is open at the top 78 of mold 70, but closed at the bottom 79 of the mold by platform 71.

As shown in FIGS. 9 and 10*a,* block 1 is preferably molded vertically, i.e., the end 6 to end 7 dimension of block 1 is positioned vertically in mold 70 from top 78 to bottom 79. Vertical wall 80, which delimits volume 77, defines the cross-sectional shape of block 1. Vertical wall 80 includes a first pair of opposed sidewalls 81*a,* 81*b* and second pair of opposed sidewalls 82*a,* 82*b.*

Also as shown in FIG. 10*a,* block 1 is preferably formed in pairs. For example, volume 83 in FIG. 10*a* defines a composite block 84 which comprises a first block 85 and second block 86 pair. Vertical wall 80 is configured so that blocks 85, 86 are positioned top to top, i.e., top 2 of block 85 is parallel and connected to top 2 of block 86 at plane 89. As will be discussed further below, composite block 84 is split along plane 89 to form first block 85 and second block 86, each having a natural or split surface appearance at top 2. The first pair of opposed sidewalls 81a, 81b define bottom 3 of block 85 and bottom 3 of block 86, respectively. The second pair of opposed sidewalls 82a, 82b define sides 4, 5 of block 85 and sides 4, 5 of block 86.

Figure 11:
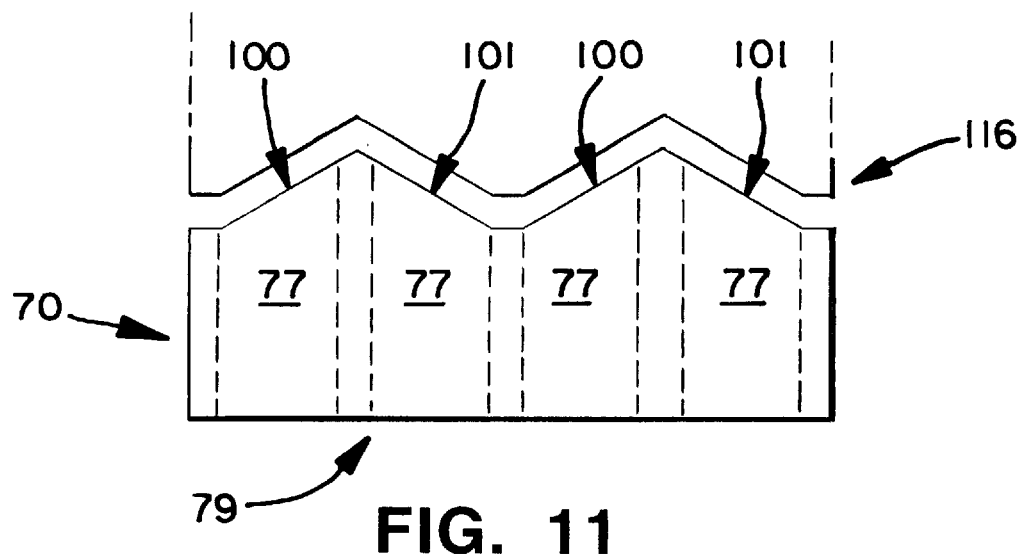
FIG. 11 is a sectional view of an embodiment of the mold along line x—x of the present invention.
Figure 12:
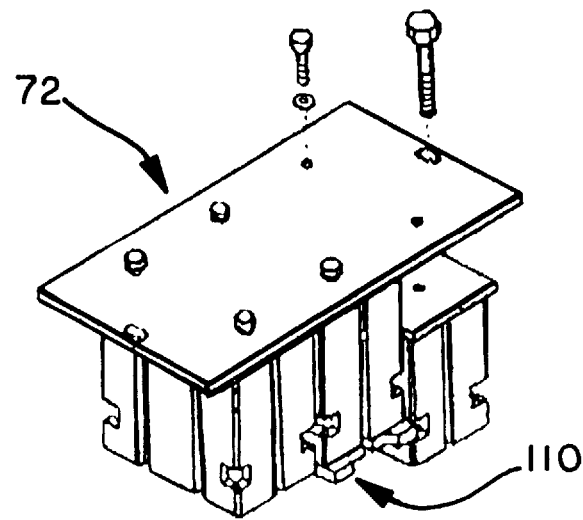
FIG. 12 is a perspective view of the compression head and shoe assembly of the present invention.

When mold 70 is positioned in the molding position on platform 71, the second end 7 of blocks 85, 86, respectively, is defined by platform 71. The first angled end 6 of blocks 85, 86 are formed at the top 78 of mold 70. As shown in the front view of mold 70, FIG. 11, the top 78 of mold 70 has a saw-tooth or serrated shape. The angle of each side 100, 101 of top 99 defines the angle of the first end of each block 77 in the four respective rows 99 of mold 70.

In one embodiment, mold 70 is formed by a solid block of steel, for example, with volume 77 machined out of the solid block.

Figure 13:
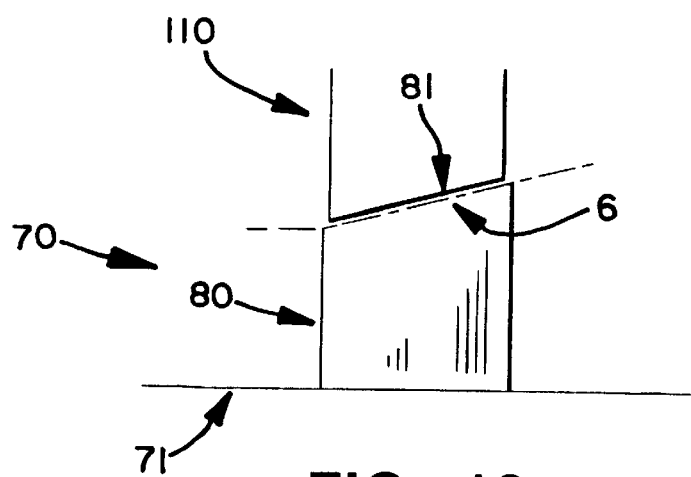
FIG. 13 is a side view of the shoes of the present invention.

In order to form angled end 6 on blocks 85, 86 in mold 70, compression means 72 includes a plurality of shoes 110, with each shoe 110 fitting over the top of each volume 77 to form angled end 6. The general head 72 and shoe 110 configuration is shown in FIG. 13.

Figure 14:
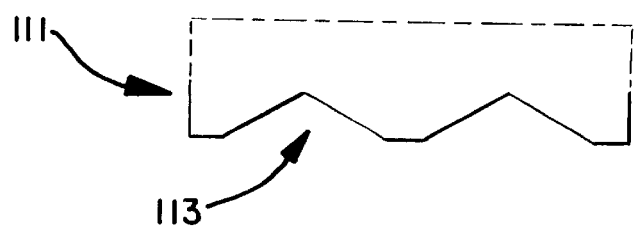
FIG. 14 is a partial front view of the cut-off bar of the present invention.

As shown in FIG. 14, the bottom 81 of each shoe 110 has an angle complementary to the desired angle of first end 6 of each molded block 1. Therefore, when head 72 is compressed downward into mold 70 and each shoe 110 compresses into each volume 77, there is equal pressure across angled end 6, thereby forming a structurally sound angled end 6 on block 1.

Figure 15:
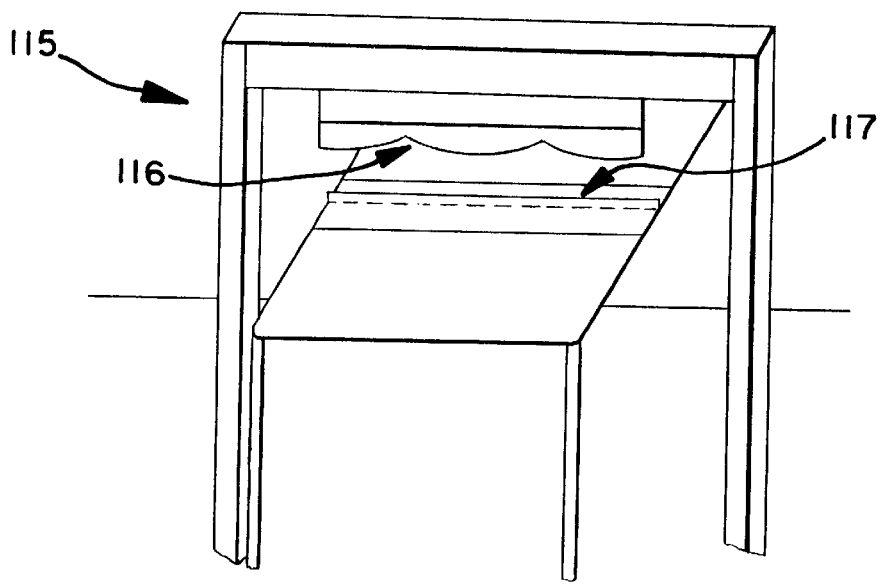
FIG. 15 is a front view of a splitter of the present invention.

As discussed above, block machines may include a cut-off bar to scrape excess concrete off the top 78 of mold 70 and bottom of shoes 110. As shown in FIG. 15, one embodiment of cut-off bar 111 has a serrated bottom edge 113 with angles complementary to the top 78 of mold 70. In another embodiment, cut-off bar 111 is generally rectangular with planar top and bottom edges. In use, this embodiment would move up and down following the contours of the top 78 of mold 70 and shoes 110. In another embodiment, cut-off bar 111 may have flexible top and bottom edges.

Figure 10B:
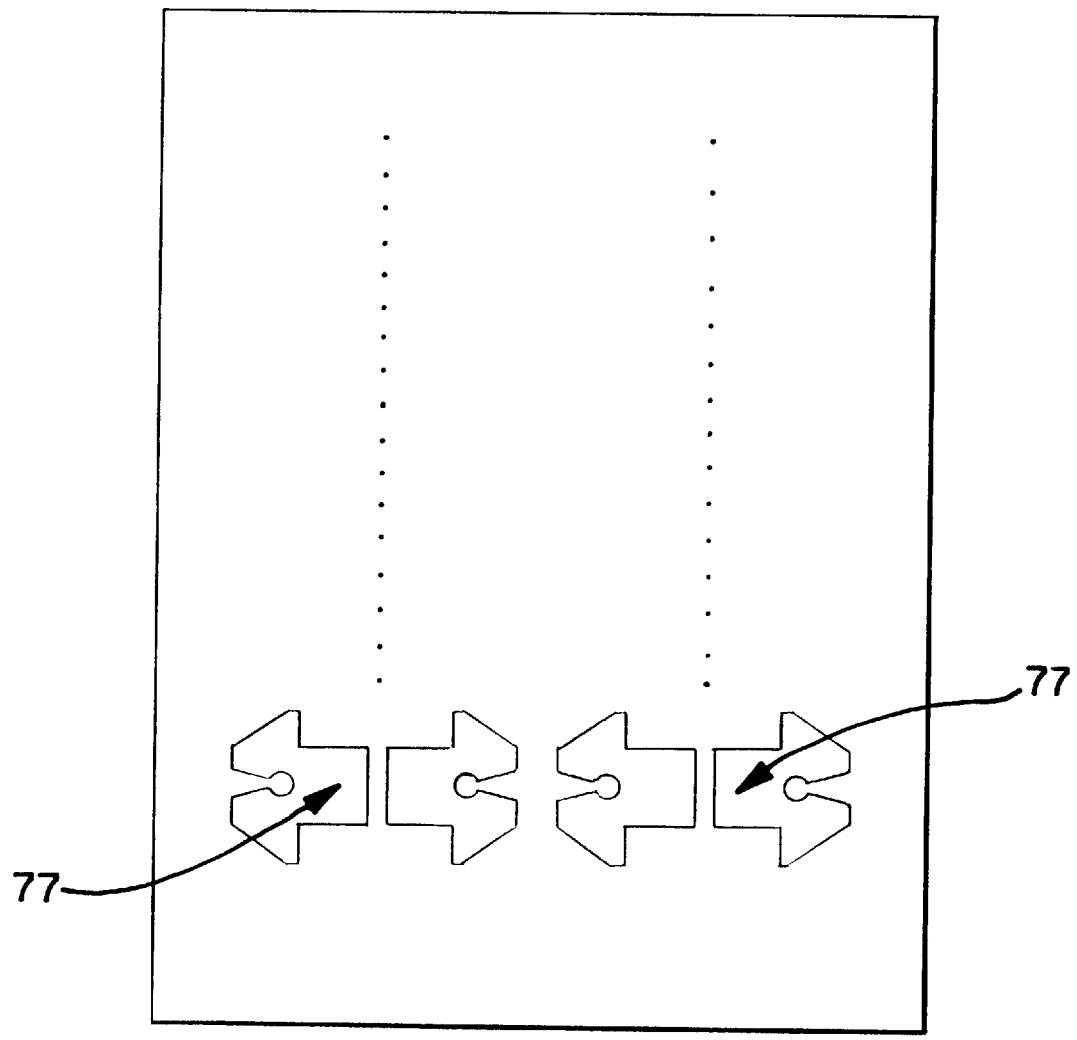
FIG. 10b is a top view of an alternate embodiment of the mold of the present invention.

In an alternate embodiment, volumes 77 in mold 70 are rotated ninety degrees, as shown in FIG. 10b. The angles on shoes 110 are also rotated ninety degrees to retain the same angled ends 6 on block 1.

Figure 16:
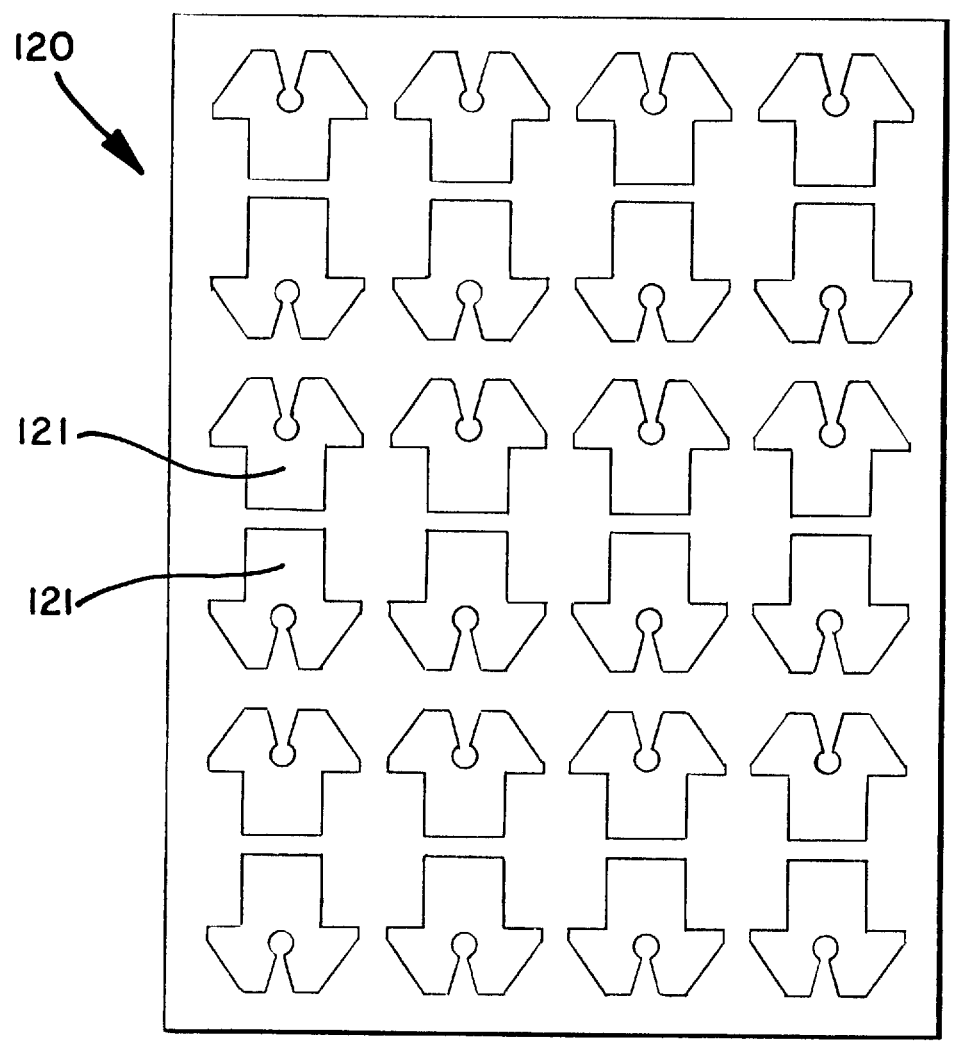
FIG. 16 is a top view of an alternate embodiment of the mold of the present invention.

Once composite block 84 is formed using mold 70 and head 72 described above, it is cured. After curing, block 84 is split. FIG. 16 generally shows a splitter 115 that can be used with the present invention. A top blade 116 and bottom blade 117 are used to split block 84 along the desired plane 89.

Since composite block 84 is molded having a top angled end, top blade 116 is serrated with angles that are complementary to the angled end of composite block 84. Since the bottom of composite block 84 is flat, bottom blade 117 is straight. When composite block 84 is positioned in splitter 115 so that blades 116 and 117 are co-planar with plane 89, bottom blade 117 is forced upward and top blade 116 is forced downward, thereby applying generally equal pressure along plane 89 to split block 84 into blocks 85 and 86.

Additionally, as shown in FIG. 10, sidewalls 82a, 82b may include v-shaped grooves 130a, 130b, respectively, that assists in providing a clean split along plane 89. Further, a v-shaped groove 131 can be provided at the end of composite block 84 defining ends 6 of blocks 85 and 86 to assist in providing a straight split at plane 89. Mold 70 in FIG. 10a is configured so that when composite block 84 is split into separate blocks, the splitting process does not force adjacent blocks away from each other, thereby requiring additional handling or processing of the blocks. Referring to FIG. 10a, when the first line of composite blocks, identified as blocks A through D, are split, the angled end 6 on blocks A and D slopes downward toward walls 75a and 75b respectively. Therefore, blocks A and D do not fall away from blocks B and C.

In the embodiment of mold 70 shown in FIGS. 9 and 10, twelve pairs of blocks 1 are formed with each pair having a block 1 with an angled end 6 complementary to the angled end 6 of the other block 1 of the pair, yielding twenty-four blocks per cycle. In a typical set-up, six to ten molding cycles may be completed per minute.

Mold 70 need not form block 1 in pairs. FIG. 16 shows an alternate mold 120 where each volume 121 defines the cross-sectional shape of a single block 1. In this embodiment, splitter 115 is not required.

The above discussion provides various examples and embodiments of the invention and are not intended to limit the scope of the invention.

We claim:

1. A method of installing a landscaping block in a substrate comprising:
   providing a landscaping block having a top and a generally opposed bottom, first and second generally opposed sides, each side extending from the top to the bottom, first and second generally opposed ends, each end extending from the top to the bottom and from the first side to the second side, wherein the first side comprises a first upper face extending from the top downward to an inner edge of a first lip, the first lip extending outward from the first upper face to an outer edge of the first lip, and a first lower face extending from the outer edge of the first lip to the bottom, and further wherein the second side comprises a second upper face extending from the top downward to an inner edge of a second lip, the second lip extending outward from the second upper face to an outer edge of the second lip, and a second lower face extending from the outer edge of the second lip to the bottom, and
   inserting the block into the substrate such that at least one of the first and second lips is below and at least partially anchored by an upper surface of the substrate.

2. The method of claim 1 wherein the step of inserting the block into the substrate includes providing the block wherein each of the first and second lips is below and at least partially anchored by an upper surface of the substrate.

3. The method of claim 1 wherein the step of providing a landscaping block includes providing the block wherein at least one of the first and second lower faces is tapered inward from the outer edge of its lip toward the bottom.

4. The method of claim 1 wherein the step of providing a landscaping block includes providing the block wherein each of the first and second lower faces is tapered inward from the outer edge of its lip toward the bottom.

5. The method of claim 1 wherein the step of providing a landscaping block includes providing the block wherein the block further comprises first and second generally opposed interior walls extending from the bottom toward the top, the interior walls defining a groove opening into the bottom and extending from the first end to the second end.

6. The method of claim 5 further including connecting adjacent landscaping blocks with couplers positioned within the groove openings.

7. The method of claim 6 wherein the connecting step is performed with couplers that are discontinuous.

8. The method of claim 6 further including connecting a plurality of adjacent landscaping blocks with a substantially continuous coupler positioned within the groove openings.

9. A method of installing a landscaping block in a substrate comprising:

provided a landscaping block having a top and a generally opposed bottom, first and second generally opposed sides, each side extending from the top to the bottom, first and second generally opposed ends, each end extending from the top to the bottom and from the first side to the second side, wherein the first side comprises a first upper face extending from the top downward to an inner edge of a first lip, the first lip extending outward from the first upper face to an outer edge of the first lip, and a first lower face extending from the outer edge of the first lip to the bottom, and further wherein the second side comprises a second upper face extending from the top downward to an inner edge of a second lip, the second lip extending outward from the second upper face to an outer edge of the second lip, and a second lower face extending from the outer edge of the second lip to the bottom, wherein at least one of the first and second lower faces is tapered inward from the outer edge of its lip toward the bottom, and inserting the block into the substrate such that the outer edge of at least one of the first and second lips substantially aligns with an upper surface of the substrate.

10. A method of installing a landscaping block in a substrate comprising:

providing a landscaping block having a top and a generally opposed bottom, first and second generally opposed sides, each side extending from the top to the bottom, first and second generally opposed ends, each end extending from the top to the bottom and from the first side to the second side, wherein the first side comprises a first upper face extending from the top downward to an inner edge of a first lip, the first lip extending outward from the first upper face to an outer edge of the first lip, and a first lower face extending from the outer edge of the first lip to the bottom, and further wherein the second side comprises a second upper face extending from the top downward to an inner edge of a second lip, the second lip extending outward from the second upper face to an outer edge of the second lip, and a second lower face extending from the outer edge of the second lip to the bottom, wherein each of the first and second lower faces is tapered inward from the outer edge of its lip toward the bottom, and inserting the block into the substrate such that the outer edge of at least one of the first and second lips substantially aligns with an upper surface of the substrate.

\* \* \* \* \*